United States Patent [19]

De Long

[11] 4,049,869

[45] Sept. 20, 1977

[54] METHOD FOR PRESERVING POROUS INORGANIC SUBSTRATES

[75] Inventor: Charles F. De Long, Washington, D.C.

[73] Assignee: United States Trading International, Inc., Washington, D.C.

[21] Appl. No.: 614,924

[22] Filed: Sept. 19, 1975

[51] Int. Cl.² .................... B05D 7/24; B32B 13/12; B32B 3/00
[52] U.S. Cl. .................... 428/413; 427/136; 427/160; 427/245; 428/522
[58] Field of Search .................... 427/160, 245, 136; 428/413, 500, 522

[56] References Cited

U.S. PATENT DOCUMENTS

| | | | |
|---|---|---|---|
| 3,196,122 | 7/1965 | Evans | 428/451 X |
| 3,795,533 | 3/1974 | Lal Gauri | 427/336 X |
| 3,850,661 | 11/1974 | Dreher et al. | 427/136 |
| 3,900,622 | 8/1975 | Caramanian | 428/413 X |

*Primary Examiner*—James R. Hoffman
*Attorney, Agent, or Firm*—Strauch, Nolan, Neale, Nies & Kurz

[57] ABSTRACT

A method for protecting porous inorganic substrates from damage by salt water, gaseous pollutants, graffiti, and erosion consists of applying to the porous inorganic substrate a gas and vapor permeable preservative composition consisting of an aqueous solution or dispersion of a carboxylated hydrophilic acrylic polymer, a cross-linking agent for the carboxylated hydrophilic acrylic polymer, and an effective amount of an ultraviolet-absorbing agent.

26 Claims, No Drawings

METHOD FOR PRESERVING POROUS INORGANIC SUBSTRATES

BACKGROUND OF THE INVENTION

This invention relates to a preservative composition for porous inorganic substrates and to the protection of porous inorganic substrates from damage by salt water, gaseous pollutants, graffiti, and erosion.

The erosion of ancient stone art objects, or of modern stone and concrete structures, by salt water, rain, or gaseous pollutants, alone or in combination, has become a problem of substantial proportions owing to high concentrations of acidic gases in the atmosphere. The major sources of these pollutant materials are automobiles, power plants and industrial installations, which together pour thousands of tons of soot and harmful chemicals, particularly sulfur dioxide and nitrogen oxides, into the air each day. These gases, which wash stone and concrete buildings, including marble and limestone art objects and ancient cathedrals, damage the structures by causing gradual dissolution of carbonate minerals.

Another problem of modern day civilization is the tendency of irresponsible members of the public to inscribe graffiti on public buildings. It is apparent that a method of protecting the buildings from such graffiti would be highly desirable, particularly if the protective system also afforded protection against the effects of atmospheric pollution and moisture.

Although various coatings have been used on stone work and concrete constructions, generally these compositions have been inadequate for protecting the stone or concrete against damage by atmospheric pollutants and graffiti, usually because the coating did not permit the structures to "breathe," that is, the exchange vapor, carbon dioxide and other gases, with the air.

In the road maintenance art, a long-standing problem is the damage caused to concrete roadbeds, road dividers, curbs and sidewalks by materials used in deicing operations, e.g., rock salt (sodium chloride), calcium chloride or urea. Protective coatings for concrete or Portland cement-based structures must be such that the structure can recieve water vapor, carbon dioxide, etc. That is, concrete structures must breathe. On the other hand, the concrete structure must be protected from chemicals used for deicing, which would otherwise leach into the cement and tend to cause its disintegration. For example, it is necessary to replace the curbs in the Washington, D.C., area on the average of every third year owing to combined damage by run off from salts used to melt snow and the accumulation of salted snow piled on the curbs by snow plows. The replacement rate varies according to the amount of salts used to melt snow, but it will be appreciated that the relative economy of salt compared to other methods mandates its use in many sections of the country.

It is known in the art of protecting and preserving stone objects to use a mixture containing barium or strontium ions in order to cause the precipitation of barium or strontium sulfate in objects made from calcareous stones, such as limestone and sandstone, to effect consolidation of the stone. However, as indicated in Sayre (U.S. Pat. No. 3,704,159), the technique is not as simple as it appears, because of the need to deposit more than a few crystals of barium or strontium sulfate at the surface of the stone object. An additional drawback of this method is that several of the known methods require more than one process step and are therefore expensive in terms of labor. Moreover, the use of barium or strontium salts as a binder does not protect the stone objects against graffiti.

Berger, in U.S. Pat. No. 3,438,804, teaches that polyisobutenylsuccinic anhydride can be used as a preservative for normally water-absorbent materials, such as concrete highways and bridges. The materials are applied from a water-hexane emulsion to produce a water-repellant coating which is permeable to water and gases. However, the hydrophobic film is not permanent, in that there is a significant increase of water-absorbency in treated samples of concrete after seven weeks' outdoors testing.

Dreher et al (U.S. Pat. No. 3,850,661) suggest the use of an epoxide-based composition for impregnating porous inorganic substrates, including roadways. However, the composition has a very short pot life, of the order of eight hours or shorter, so that the composition is difficult to handle.

Evans (U.S. Pat. No. 3,196,122) teaches the preparation of acid-resistant cementitious material, in which a polymeric latex and a hydraulic cement are the basic ingredients. Although this material can be used for patching and overcoating masonry structures, it appears to provide no protection against graffiti or salt water.

Lal Grant (U.S. Pat. No. 3,795,533) teaches preserving and strengthening wood or stone by a treatment involving sequential impregnation with a plurality of solvent-resin solutions. The deficiency of this method over a one-step process will be readily apparent.

Thus, there is a continuing need for materials which protect porous inorganic substrates from the deleterious effects of salt water, acidic gases, erosion, graffiti and the like and which are simple to apply and have a reasonable working life.

SUMMARY OF THE INVENTION

It has been found, in accordance with this invention, that porous inroganic substrates can be protected from the ravages of salt water, gaseous pollutants, graffiti and erosion by applying thereto a gas and vapor permeable preservative composition consisting of an aqueous solution or dispersion of a carboxylated hydrophilic acrylic polymer, a cross-linking agent for the carboxylated hydrophilic acrylic polymer and an effective amount of an ultraviolet-absorbing agent. In a preferred embodiment of this invention, the composition used to facilitate the removal of graffiti also contains polyethylenimine or a hydrophilic polyethylenimine derivative.

The preservative compositions of this invention further provide a transparent covering for the surface being protected, so as to keep the surface clean, and add richness to the appearance of the surface, in addition to the more critical function of protecting the surface against accelerated weathering. Although the compositions of this invention are permeable to carbon dioxide, water vapor and, to a limited extent, rain water, they are relatively impermeable to electrolytes such as salt water and acidic rain waters. It is thought that the compositions of this invention become selectively impermeable owing to an increase in ionic strength and/or acidity or solutions containing salt or acidic pollutants.

As used in the specification and claims, "porous inorganic substrates" includes concrete, marble, limestone, sandstone, hydraulic cement, cinder blocks, bricks, asbestos cement, mortar gypsum blast furnace cement, alumina cement and the like in the form of roads, buildings, monuments, sidewalks or the like.

As used in the specification and claims "carboxylated hydrophilic acrylic polymer" means any copolymer which contains at least some carboxylic acid groups introduced by polymerization of an alpha,beta-unsaturated acid. Examples of alpha,beta-unsaturated acids for the purposes of this invention include acrylic acid, methacrylic acid, itaconic acid, crotonic acid, maleic acid, citraconic acid, ethacrylic acid and the like. Acrylic acid is preferred.

Monomers usable in the preparation of the carboxylated hydrophilic polymers of this invention include the lower alkyl acrylate and methacrylate esters and monomers polymerizable therewith, including, but not limited to styrene, vinyl acetate, ethyl vinyl ether, substituted styrenes, and the like. However, the hydrophilic carboxylated polymers prepared from lower alkyl acrylate and methacrylates and carboxylic monomer exclusively are preferred. Typical of the esters preferred for making the carboxylated hydrophilic copolymers are the $C_1$–$C_4$ alkyl acrylates and methacrylates, such as methyl acrylate, ethyl acrylate, n-propyl acrylate, isopropyl acrylate, the butyl acrylates and the corresponding methacrylates. Especially preferred monomers are methyl methacrylate, ethyl methacrylate, butyl acrylate, ethyl acrylate, methyl acrylate and mixtures thereof, particularly with from about 5% to about 20% by weight of acrylic acid monomer.

A composition particularly preferred for the purposes of this invention consists of a copolymer based on about 56% by weight of methyl methacrylate, about 30% by weight of ethyl methacrylate and about 14% by weight of acrylic acid. An equally preferred composition is based on about 44% by weight of butyl acrylate, 40% by weight of methyl acrylate and about 16% by weight of acrylic acid. Also preferred is a polymer containing about 90% by weight of ethyl acrylate and about 10% by weight of acrylic acid units.

Typical of commercially available hydrophilic polymers which can be used according to this invention is Carboset$^R$514, a dispersion in ammonia water (305 solids), or Carboset$^R$514H, a dispersion in ammonia water (40% solids) or isopropanol (70% solids) available from the B. F. Goodrich Chemical Co.

For ease of application, the copolymer or terpolymer is preferably solubilized in water by adjustment of the pH to as near 7.5 as possible. Suitable materials for adjustment of the pH include sodium hydroxide, ammonium hydroxide, potassium hydroxide or organic amines, including but not limited to dimethylamine, diisopropylamine, polyethylenimine, morphline, triethylamine, ethylenediamine, 2-methylpiperazine, monoamylamine, dibutylamine, 2-amino-2-methyl-1,3-propanediol and the like. Of the foregoing, ammonium hydroxide and diisopropylamine are preferred. It is thought that the amines vaporize during the curing process.

The molecular weight of the copolymer or terpolymer prior to cross-linking can vary between about 5,000 and three million. Preferably, the molecular weight is between about 10,000 and 100,000. Although it is difficult to determine the molecular weight of the product after cross-linking, it is thought generally to be up to 1 million or higher.

Cross-linking agents suitable for the purposes of this invention include difunctional materials which react with the carboxyl groups of the hydrophilic acrylic polymers used herein. Exemplary of cross-linking agents which convert the hydrophilic polymers of this invention to essentially permanent protective compositions are formaldehyde-condensation resins, epoxy compounds and multivalent metal ions. Formaldehyde resins include those based on melamine, such as the methylol melamines and the lower molecular weight melamine-formaldehyde resins as well as methylolated phenols and lower molecular weight phenolformaldehyde resins. Epoxy compounds include diglycidyl and triglycidyl ethers and low molecular weight epoxy resins. Typical of multivalent metal ions which can be used are zinc, chromium, aluminum, iron, calcium and titanium, in the form of salts, oxides or hydroxides.

Among commercially available formaldehyde resins which can be used as cross-linking agents are melamine-formaldehyde resins used as Resimene$^R$RF 5306 (Monsanto Chemical Co.) and Cymel$^R$300 (American Cyanamid Co.). Melamine-formaldehyde resins and methylolated melamine derivatives are among the cross-linking agents preferred for the practice of this invention.

Commercially available epoxy compounds for the purposes of this invention include Epon$^R$828 (Shell Chemical Co.), the diglycidyl ether derived from epichlorohydrin and bisphenol A; Epon$^R$812 (Shell Chemical Co.), the triglycidyl ether of glycerol; Eponite$^R$100 (Shell Chemical Co.), a water-dispersible epoxy resin; and DER 332 (Dow Chemical Co.). Preferred epoxy compounds are the diglycidyl and triglycidyl ethers, especially bisphenol A diglycidyl ether and glycerine triglycidyl ether.

Although a variety of metallic ions can be used to provide cross-linking, the preferred system is one in which the cross-linking agent is zinc ions. A convenient way of preparing materials using zinc ions as cross-linking agent is to use a solution of zinc ammonium carbonate complex, which is added to the solution or dispersion of polymer.

The amount of cross-linking agent can be varied from about 1.0 to about 10% by weight (as solids) of the aqueous solution or dispersion. Preferably the amount of cross-linking agent is from about 1.0 to about 5% by weight of the aqueous solution or dispersion.

Although the compositions used according to this invention ultimately become cross-linked and permanently adhere to the porous inorganic substrates being protected, it will be understood that the compositions as prepared have a reasonable life, provided that the hydrophilic acrylic resins and cross-linking agent are mixed at the site of application. Thus, a system consisting of a carboxylated acrylic terpolymer and a glycidyl ether has a life of about six days at room temperature, so that compositions for the practice of this invention can be prepared several days before use. Compositions using melamine-formaldehyde resins as the cross-linking agent have an apparently indefinite shelf life. Preferably, however, the hydrophilic acrylic resin and cross-linking agent are mixed just prior to use so that the products are of low viscosity for ease of application.

"Ultraviolet-absrobing agent," as used in the specification and claims, means a material which is compatible with the carboxylated hydrophilic acrylic polymer and cross-linking agent which absorbs incident radiation in the range between about 2,700 A and about 4,000 A. Among materials known to function as ultraviolet-absorbing agents are coumarin ethers; esters of para-aminobenzoic acid, such as the glyceryl ester; esters of substituted para-aminobenzoic acids and para-methoxycinnamic acid, e.g., the 2-ethoxyethyl ester; benzophenone derivatives, e.g., 2-hydroxy-4-methoxybenxophenone, triazolylketones, such as 2-phenyl-4-(2',4'-dihydroxybenzoyl)-v-triazoles and the corresponding ethers and esters; hydrozones derived from aromatic aldehydes; 2-phenylbenzoxazole derivatives; bisoxalic acid diamides, benzoylbenzofuran derivatives formazan derivatives and metal chelates of bicyclononanedione esters; bis-alpha-cyano-beta,beta-diphenylacrylic acid derivatives; 2-aryl-4,5-arylo-1,2,3-triazoles; beta-benzolyloxy-2'-hydroxychalcones and the like.

Among the preferred ultraviolet-absorbing materials used in accordance with this invention are those which absorb from about 2,700 A to about 3,300 A. Among compounds which absorb selectively in this more limited region are benzoylbenzofurans (baron et al, U.S. Pat. No. 3,448,190), which absorb primarily from about 2,900 A to about 3,200 A and various cinnamate esters, which absorb from about 2,700 A to about 3,300 A. Particularly preferred as an ultraviolet-absorber is 2-ethoxyethyl p-methoxycinnamate, available under the trade name of Giv-Tan$^R$F from Sindar Division of Giuvadan Corp., Clifton, N.J.

The effective amount of ultraviolet-absorbing agent used in the practice of this invention is from about 0.01% to about 10% by weight of the aqueous solution or dispersion. However, the preferred range is from about 0.01% to about 2.0% by weight.

"Polyethylenimine or hydrophilic polyethylenimine derivative," as used in the specification and claims, includes derivatives of materials which can vary in molecular weight from about 1,000 to about 100,000. Hydrophilic polyethylenimine derivatives within the scope of his definition include hydroxyethylated polyethylenimine, which is the reaction product of polyethylenimine with ethylene oxide; propoxylated polyethylenimine, which is the reaction product of polyethylenimine with propylene oxide; epichlorohydrin-modified polyethylene imine and urea-modified polyethylenimine. Generally, a weight ratio of 1:1 to 1:0.1 of polyethylenimine to ethylene oxide is preferred; for propylene oxide, 1:0.1 to 1:1.1; for epichlorohydrin about 1:1 and for urea about 1:1. Preferably, polyethylenimine or hydrophilic polyethylenimine derivatives used in the practice of this invention have a molecular weight from 1,000 to about 60,000, most preferably from about 40,000 to about 60,000.

Polyethylenimine can be purchased from the Dow Chemical Co., Midland, Michigan. The product designated as PEI 600 has a molecular weight in the 40,000 to 60,000 range. PEI and other commercially available polyethylenimines can be modified as set forth above to give hydrophilic derivatives.

The weight ratio of polyethylenimine or hydrophilic polyethylenimine derivative to carboxylated hydrophilic acrylic polymer is preferably varied from about 1:1 to about 10:1 in the compositions of this invention particularly adapted for protecting surfaces against graffiti.

The combination of carboxylated hydrophilic acrylic polymer and polyethylenimine or hydrophilic polyethylenimine derivative, if present, constitutes from about 5 to about 60% by weight of the solution or dispersion. Preferably, however, the combination constitutes from about 10 to about 50% by weight of the solution or dispersion.

The amount of cross-linking agent can be varied from about 0.1 to about 15% by weight of the solution, but amounts of the order of about 1.0% to about 10% by weight are preferred.

The solutions or dispersions of this invention can be applied directly or following dilution with from about one to about ten volumes of water. Undiluted compositions are preferably used for protection against graffiti. For other purposes or for ease of application, dilution with three to six volumes of water is preferred. The recommended dilution depends essentially on the porosity of the substrate being protected. For example, a six-fold dilution is preferred for application to hard marble and a three-fold dilution for application to limestone.

The method of this invention contemplates application of the preservative composition to porous inorganic substrates prepared only by simple cleaning by a variety of conventional techniques, including pressure spraying, brushing, doctor blade application and the like. The preservative composition is permitted to dry in the air, unless the user desires to accelerate the cross-linking process by application of heat below temperatures at which the polymeric constituents would burn or melt.

Generally, the amount of solution or dispersion is applied at the rate of about 1 gallon to about 4 gallons per 400 square feet. Preferably, the level is 1-2 gallons per 400 square feet.

The following examples depict in more detail the preparation of representative compositions and methods of their application in accord with the principles of the present invention.

EXAMPLE 1

A dispersion was prepared by combining in a 55-gallon container equipped with a propeller agitator and agitating vigorously:

| | |
|---|---|
| 120 liters | water |
| 30 liters | terpolymer (56% by weight of methyl methacrylate, 30% of ethyl methacrylate and 14% of acrylic acid; molecular weight 30,000; 30% solution in water; pH 7.5) |
| 80 milliliters | emulsifier (Darvan® No. 7) |
| 80 milliliters | 2-ethoxyethyl p-methoxycinnamate |

To the dispersion was added three liters of glycerine triglycidyl ether. The resulting material was diluted with three parts by volume of water and sprayed on concrete sidewalk.

EXAMPLE 2

Material was prepared by the method of Example 1, except that bisphenol A diglycidyl ether was used. The product, after dilution with three volumes of water, was brushed on a brick building surface, which maintained good appearance.

EXAMPLE 3

A dispersion was prepared by stirring the following together:

| | |
|---|---|
| 30 liters | copolymer (90% by weight of ethyl acrylate and 10% of acrylic acid; molecular weight 30,000; 30% by weight in aqueous ammonia; pH 7.5) |
| 10 liters | ammonium dichromate (30% by weight solution in water) |
| 45 liters | aqueous ammonia (3% by weight of |

| | |
|---|---|
| 100 liters | polyethylenimine (molecular weight 40,000–60,000; 40% by weight in water) |
| 3 liters | 2-ethoxyethyl p-methoxycinnamate |

Immediately before use, a glycidyl ether (glyceryl triglycidyl ether or bisphenol A diglycidyl ether) was added at the rate of about 6 ounces per 5 gallons of solution. The resulting solution was brushed on concrete, brick or stone substrates.

EXAMPLE 4

The following product was prepared by stirring together the following:

| parts by weight | |
|---|---|
| 40 | terpolymer (44% by weight of butyl acrylate, 40% of methyl acrylate and 16% of acrylic acid; molecular weight 16,000; 30% by weight in water; pH 7.5) |
| 2 | aqueous ammonia (3% by weight of ammonia) |
| 200 | polyethylenimine (molecular weight 30,000–40,000; 40% by weight in water) |
| 300 | deionized water |
| | zinc ammonium carbonate complex obtained from 7.2 parts by weight of ZnO, 12.7 parts of ammonium carbonate, 71.4 parts of water and 8.7 parts of concentrated ammonium hydroxide |

The composition was sprayed on concrete, stone or brick substrates. Results were similar to those of Examples 1 and 2.

EXAMPLE 5

A solution is prepared from 30 parts by weight of a copolymer obtained from 90 parts by weight of ethyl acrylate and 10 parts by weight of acrylic acid (30% by weight solution in aqueous ammonia; pH 7.5); 10 parts by weight of ammonium dichromate solution (30% by weight, 3% by weight of ammonia); 200 parts by weight of polyethylenimine (molecular weight 40,000–60,000; 40% solution by weight in water); 350 parts by weight of deionized water and 30 parts of 2-ethoxyethyl p-methoxycinnamate.

The solution is applied to building surfaces to protect against graffiti.

It will be appreciated that the instant specification and foregoing examples are set forth by way of illustration and not limitation and that various modifications and changes may be made without departing from the spirit and scope of the present invention, which is intended to be limited only by the appended claims.

What is claimed is:

1. A method for preserving porous inorganic substrates consisting of applying to the porous inorganic substrate a gas and vapor permeable preservative composition consisting of an aqueous solution or dispersion of a carboxylated hydrophilic acrylic copolymer containing monomer units from at least one $C_1$–$C_4$ alkyl acrylate or methacrylate and about 5 to about 20% by weight of at least one carboxylic monomer, a cross-linking agent for the carboxylated hydrophilic acrylic copolymer constituting from about 1.0 to about 10% by weight of the aqueous solution or dispersion and from about 0.1 to about 2.0% by weight of said aqueous solution or dispersion of an ultra-violet absorbing agent.

2. The method of claim 1, wherein the ultraviolet-absorbing agent absorbs from about 2,700 A to about 3,300 A.

3. The method of claim 1, wherein the composition also contains polyethylenimine or a hydrophilic polyethylenimine derivative and the hydrophilic acrylic polymer and the polyethylenimine or hydrophilic polyethylenimine derivative constitute from about 10 to about 50% by weight of the solution or dispersion.

4. The method of claim 3, wherein the ratio of polyethylenimine or hydrophilic polyethylenimine derivative to said carboxylated hydrophilic acrylic polymer is from about 1:1 to about 10:1 by weight.

5. The method of claim 1, wherein the ultraviolet-absorbing agent is 2-ethoxyethyl p-methoxycinnamate.

6. The method of claim 1, wherein said carboxylated hydrophilic acrylic polymer is a copolymer contaning monomer units from at least one $C_1$–$C_4$ alkyl acrylate or methacrylate and from about 5 to about 20% by weight of acrylic acid monomer.

7. The method of claim 1, wherein the cross-linking agent is selected from the group consisting of diglycidyl and triglycidyl ethers and low molecular weight epoxy resins.

8. The method of claim 1, wherein the cross-linking agent is selected from the group consisting of methylolated melamines and low molecular weight melamine-formaldehyde resins.

9. The method of claim 1, wherein the cross-linking agent is a multivalent inorgaic salt, oxide or hydroxide.

10. The method of claim 1, wherein the cross-linking agent is selected from zinc oxide, zinc carbonate and ammoniacal complexes thereof.

11. The method of claim 1, wherein said carboxylated hydrophilic acrylic copolymer is based on about 56% by weight of methyl methacrylate, about 30% by eight of ethyl methacrylate and about 14% by weight of acrylic acid.

12. The method of claim 1, wherein said carboxylated hydrophilic acrylic copolymer is based on about 44% by weight of butyl acrylate, 40% by weight of methyl acrylate and about 16% by weight of acrylic acid.

13. The method of claim 1, wherein said carboxylated hydrophilic acrylic copolymer is based on about 90% by weight of ethyl acrylate and about 10% by weight of acrylic acid units.

14. A porous inorganic substrate protected against damage by salt water, gaseous pollutants, graffiti, and erosion consisting of the substrate coated by a gas and vapor permeable preservative composition consisting of an aqueous solution or dispersion of a carboxylated hydrophilic acrylic copolymer containing monomer units from at least one $C_1$–$C_4$ alkyl acrylate or methacrylate and from about 5% to about 20% by weight of at least one carboxylic monomer, a cross-linking agent for the carboxylated hydrophilic acrylic copolymer constituting from about 1.0 to about 10% by weight of the aqueous solution or dispersion and from about 0.1 to about 2.0% by weight of said aqueous solution or dispersion of an ultra-violet absorbing agent.

15. The porous inorganic substrate of claim 14, wherein the ultraviolet-absorbing agent absorbs from about 2,700 A to about 3,300 A.

16. The porous inorganic substrate of claim 14, wherein the composition also contains polyethylenimine or a hydrophilic polyethylenimine derivative and the carboxylated hydrophilic acrylic polymer and the polyethylenimine or hydrophilic polyethylenimine derivative constitute from about 10 to about 50% by weight of the aqueous solution or dispersion.

17. The porous inorganic substrate of claim 17, wherein the ratio of polyethylenimine or hydrophilic polyethylenimine derivative to said carboxylated hydrophilic acrylic polymer is from about 1:1 to about 10:1 by weight.

18. The porous inorganic substrate of claim 14, wherein the ultraviolet-absorbing agent is 2-ethoxyethyl p-methoxycinnamate.

19. The porous inorganic substrate of claim 14, wherein said carboxylated hydrophilic acrylic polymer is a copolymer containing monomer units from at least one $C_1$-$C_4$ alkyl acrylate or methacrylate and from about 5 to about 20% by weight of acrylic acid monomer.

20. The porous inorgaic substrate of claim 14, wherein the cross-linking agent is selected from the group consisting of diglycidyl and triglycidyl ethers and low molecular weight epoxy resins.

21. The porous inorganic substrate of claim 14, wherein the cross-linking agent is selected from the group consisting of methylolated melamines and low molecular weight melamine-formaldehyde resins.

22. The porous inorganic substrate of claim 14, wherein the cross-linking agent is multivalent inorganic salt, oxide or hydroxide.

23. The porous inorganic substrate to claim 14, wherein the cross-linking agent is selected from zinc oxide, zinc carbonate and ammoniacal complexes thereof.

24. The porous inorganic substrate of claim 14, wherein said carboxylated hydrophilic acrylic copolymer is based on about 56% by weight of methyl methacrylate, about 30% by weight of ethyl methacrylate and about 14% by weight of acrylic acid.

25. The porous inorganic substrate of claim 14, wherein said carboxylated hydrophilic acrylic copolymer is based on about 44% by weight of butyl acrylate, 40% by weight of methyl acrylate and about 16% by weight of acrylic acid.

26. The porous inorganic substrate of claim 14, wherein said carboxylated hydrophilic acrylic copolymer is based on about 90% by weight of ethyl acrylate and about 10% by weight of acrylic acid units.

* * * * *

UNITED STATES PATENT OFFICE
CERTIFICATE OF CORRECTION

Patent No. 4,049,869　　　　　　　　　Dated September 20, 1977

Inventor(s)　Charles F. De Long

It is certified that error appears in the above-identified patent and that said Letters Patent are hereby corrected as shown below:

Column 2, line 41, "inroganic" should read -- inorganic --.

Column 3, line 42, "305" should read -- 30% --.

Column 5, line 34, "his" should read -- this --.

Column 8, line 19, "containing" should read -- containing --.

Column 9, line 5, "17" should read -- 16 --.

Signed and Sealed this

Seventh Day of March 1978

[SEAL]

Attest:

RUTH C. MASON
*Attesting Officer*

LUTRELLE F. PARKER
*Acting Commissioner of Patents and Trademarks*